United States Patent
Salameh et al.

(10) Patent No.: US 10,616,036 B2
(45) Date of Patent: Apr. 7, 2020

(54) INTEGRATION PLATFORM FOR MULTI-NETWORK INTEGRATION OF SERVICE PLATFORMS

(71) Applicant: Accenture Global Solutions Limited, Dublin (IE)

(72) Inventors: Tariq Mohammad Salameh, Dubai (AE); Marco Intermite, Abu Dhabi (AE); Matteo Luca Maga, Dubai (AE); Federica Rossi, Dubai (AE)

(73) Assignee: Accenture Global Solutions Limited, Dublin (IE)

( * ) Notice: Subject to any disclaimer, the term of this patent is extended or adjusted under 35 U.S.C. 154(b) by 158 days.

(21) Appl. No.: 15/616,007

(22) Filed: Jun. 7, 2017

(65) Prior Publication Data

US 2018/0359132 A1  Dec. 13, 2018

(51) Int. Cl.
| | |
|---|---|
| *H04L 12/24* | (2006.01) |
| *G06N 3/00* | (2006.01) |
| *H04L 29/08* | (2006.01) |
| *G06F 16/332* | (2019.01) |
| *G06F 16/95* | (2019.01) |

(Continued)

(52) U.S. Cl.
CPC ........ *H04L 41/0273* (2013.01); *G06F 3/0481* (2013.01); *G06F 16/3329* (2019.01); *G06F 16/95* (2019.01); *G06N 3/006* (2013.01); *G06N 3/04* (2013.01); *G06N 3/0445* (2013.01);

(Continued)

(58) Field of Classification Search
None
See application file for complete search history.

(56) References Cited

U.S. PATENT DOCUMENTS 8,788,257 B1 *  7/2014  Su ........................... G06F 17/27
                                                          704/10
9,047,308 B2   6/2015  Bickle et al.
(Continued)

FOREIGN PATENT DOCUMENTS

CN   106297789   1/2017

OTHER PUBLICATIONS

AU Notice of Acceptance in Australian Appln. No. 2018203364, dated Sep. 19, 2018, 3 pages.
(Continued)

*Primary Examiner* — James A Edwards
(74) *Attorney, Agent, or Firm* — Fish & Richardson P.C.

(57) ABSTRACT

Implementations are directed to integrating a computer-executed service platform with multiple channels, and include actions of providing a transition layer as an application executed on a client-side device, which receives input from a channel of the multiple channels, and providing a unified input that is in a unified format for processing by the service platform, receiving, by the service platform, the unified input, identifying, by the service platform, a set of actions based on the unified input, the set of actions including to be executed by one or more back-end services, providing a service layer including a plurality of bots, each bot interacting with a back-end service based on an action to receive at least one result from the respective back-end service, receiving result data including data describing the at least one result, and transmitting an output based on the result data through the transition layer of the client-side device.

27 Claims, 5 Drawing Sheets

(51) Int. Cl.
- *G06N 3/04* (2006.01)
- *G06F 3/0481* (2013.01)
- *G10L 15/26* (2006.01)
- *G06Q 10/10* (2012.01)

(52) U.S. Cl.
CPC .......... *G06N 3/0454* (2013.01); *G10L 15/265* (2013.01); *H04L 67/00* (2013.01); *G06Q 10/107* (2013.01)

(56) References Cited

U.S. PATENT DOCUMENTS

| | | |
|---|---|---|
| 2004/0205772 A1 | 10/2004 | Uszok et al. |
| 2009/0138891 A1 | 5/2009 | Winig et al. |
| 2011/0055186 A1 | 3/2011 | Gopalakrishnan |
| 2011/0153325 A1* | 6/2011 | Ballinger ................ G10L 15/30 704/235 |
| 2016/0170970 A1* | 6/2016 | Lindblom ............... G06F 17/28 704/3 |
| 2017/0091849 A1 | 3/2017 | Greystoke et al. |
| 2017/0098450 A1 | 4/2017 | Chambers et al. |

OTHER PUBLICATIONS

EP Search Report and Written Opinion in European Appln. No. 18170694.6, dated Aug. 7, 2018, 7 pages.

Chen et al., "On the integration of grounding language and learning objects," Presented at National Conference on Artificial Intelligence, San Jose, CA, Jul. 25-29, 2004, 6 pages.

Tatsuro et al., "Dynamical integration of language and behavior in a recurrent neural network for human-robot interaction," Frontiers in neurorobotics, Jan. 2016.

SG Office Action in Singaporean Appln. No. 10201803450U, dated Jul. 10, 2019, 10 pages.

* cited by examiner

INTEGRATION PLATFORM FOR MULTI-NETWORK INTEGRATION OF SERVICE PLATFORMS

BACKGROUND

Integrating computer-implemented service platforms into traditional networks can be burdensome in terms of time and costs, as well as technical resources. For example, users can interact with a service platform over a network, and the service platform can interact with disparate back-end services. Each network type (e.g., telephone, text, Internet), and even network provider has their own, different network infrastructure requiring multiple, different integration architectures for the service platform to operate across the multiple networks.

SUMMARY

Implementations of the present disclosure are generally directed to an integration platform for multi-network integration of services platforms, such as a service platform including an artificial intelligence (AI)-based digital agent. More particularly, implementations of the present disclosure are directed to integration of an AI-based digital agent platform in traditional network infrastructures.

In some implementations, actions include providing a transition layer as a computer-executable application that is executed on a client-side device, the client-side device receiving input from a channel of the multiple channels, and providing a unified input, the unified input being in a unified format for processing by the service platform, receiving, by the service platform, the unified input, identifying, by the service platform, a set of actions based on the unified input, the set of actions including one or more actions to be executed by one or more computer-implemented, back-end services, providing a service layer including a plurality of computer-executable bots, each bot interacting with a respective back-end service based on an action of the one or more actions to receive at least one result from the respective back-end service, receiving result data including data describing the at least one result, and transmitting an output based on the result data through the transition layer of the client-side device. Other implementations of this aspect include corresponding systems, apparatus, and computer programs, configured to perform the actions of the methods, encoded on computer storage devices.

These and other implementations can each optionally include one or more of the following features: the client-device of the transition layer receives the input from a device of a user the device having one of a wired and a wireless connection with the client-side device; the input is provided as verbal input of a user, and the transition layer processes the verbal input to provide the unified input, the unified input comprising text; processing the verbal input partially includes transmitting the verbal input to a speech-to-text service, and receiving text data from the speech-to-text service; each bot interacts with a respective presentation layer of a back-end service to provide input to one or more user interface elements of the respective presentation layer; each bot initiates an action of the one or more actions to be performed by the respective back-end service based on at least one user interface interaction with the respective presentation layer; the output is provided through the transition layer in a format of the channel; the channel includes one or a voice channel, a messaging channel, an email channel, and a text message channel; and a noise filter is applied to the input received from the channel.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to integrating emerging platforms into legacy network systems. More particularly, implementations of the present disclosure are directed to providing an integration platform for integrating a computer-implemented service platform, such as a service platform including an artificial intelligence (AI)-based digital agent, into legacy network systems. As described in further detail herein, implementations of the present disclosure include actions of providing a transition layer as a computer-executable application that is executed on a client-side device, the client-side device receiving input from a channel of the multiple channels, and providing a unified input, the unified input being in a unified format for processing by the service platform, receiving, by the service platform, the unified input, identifying, by the service platform, a set of actions based on the unified input, the set of actions including one or more actions to be executed by one or more computer-implemented, back-end services, providing a service layer including a plurality of computer-executable bots, each bot interacting with a respective back-end service based on an action of the one or more actions to receive at least one result from the respective back-end service, receiving result data including data describing the at least one result, and transmitting an output based on the result data through the transition layer of the client-side device.

Implementations of the present disclosure are described with respect to the example context of interactions with an AI-based digital agent (referred to hereinafter as AI platform). An example AI platform is described in commonly assigned, U.S. Ser. No. 15/448,401, filed on Mar. 2, 2017, the disclosure of which is expressly incorporated herein by reference in the entirety. It is contemplated, however, that implementations of the present disclosure can be realized in any appropriate context.

In general, platforms, such as the AI platform, interact with one or more channels (e.g., applications executing on client-side devices) through a front-end, and interact with one or more back-end systems (e.g., providing back-end services) through a back-end. Prior to implementations of the present disclosure, a service platform required integration with each of multiple network infrastructures, and respective network providers. Such integrations layers are relatively complex, and costly, and are needed for each network provider. This complexity and cost is multiplied, because each network provider (e.g., telecommunications provider) has their own, different (with respect to other providers) network infrastructure. Consequently, different integration architectures would be required for different network infrastructures (e.g., interactive voice response (IVR), telephony, cellular, short messaging service (SMS), and the like). Further, a systems integrations needed to be implemented at the back-end, through which the service platform can interact with multiple back-end service providers. Such systems integrations are, again, relatively complex and costly. For legacy systems, for example, the complexity and cost can be particularly egregious, and, in some case, not feasible to integrate with the platform.

In view of this, and as described in further detail herein, implementations of the present disclosure provide an integration platform including a transition layer at the front-end that facilitates communication between the one or more channels and a service platform, and a services layer at the back-end that facilitates communication between the platform, and multiple back-end service providers. In some implementations, the transition layer provides a unified input to the service platform, regardless of which channel (e.g., network) an originating input is received from. In some implementations, the service layer provides requests to, and receives responses from multiple back-end service providers, regardless of the particular input requirements of the respective back-end service providers.

Figure 1:
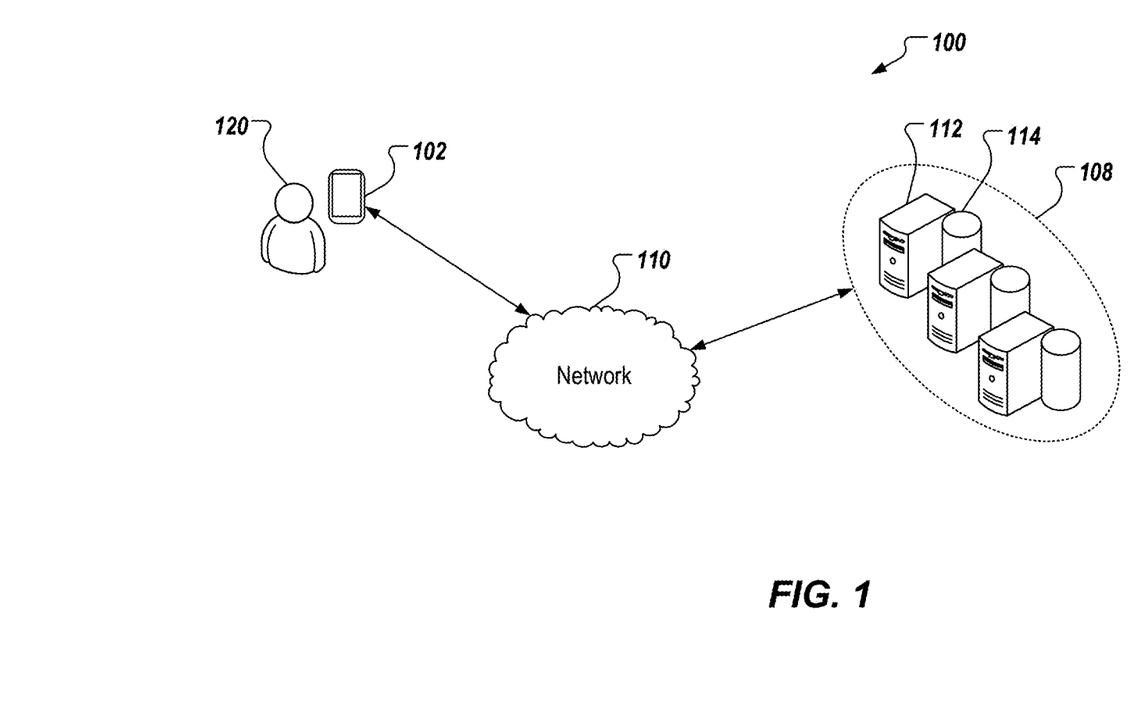
FIG. 1 depicts an example high-level architecture in accordance with implementations of the present disclosure.

FIG. 1 depicts an example high-level architecture 100 in accordance with implementations of the present disclosure. The example architecture 100 includes a device 102, a server system 108, and a network 110. In some examples, the network 110 includes a local area network (LAN), wide area network (WAN), the Internet, a cellular telephone network, a public switched telephone network (PSTN), a private branch exchange (PBX), a next generation network (NGN), or any appropriate combination thereof, and connects web sites, devices (e.g., the device 102), and server systems (e.g., the server system 108). In some examples, the network 110 can be accessed over a wired and/or a wireless communications link. For example, mobile devices, such as smartphones can utilize a cellular network to access the network 110.

In the depicted example, the server system 108 includes at least one server system 112, and data store 114 (e.g., database). In some examples, at least one server system 112 hosts one or more computer-implemented services that users can interact with using devices. For example, the server system 112 can host an AI-based digital agent in accordance with implementations of the present disclosure. In some examples, the device 102 can each include any appropriate type of computing device such as a desktop computer, a laptop computer, a handheld computer, a tablet computer, a personal digital assistant (PDA), a cellular telephone, a network appliance, a camera, a smartphone, a telephone, a mobile phone, an enhanced general packet radio service (EGPRS) mobile phone, a media player, a navigation device, an email device, a game console, or an appropriate combination of any two or more of these devices, or other data processing devices.

In the depicted example, the device 102 is used by a user 120. In accordance with the present disclosure, the user 120 uses the device 102 to audibly interact with the AI-based digital assistant of the present disclosure. In some examples, the user 120 can include a customer of an enterprise that provides the AI-based digital agent, or on behalf of which the AI-based digital assistant is provided. For example, the user 120 can include a customer that calls into a call center of the enterprise using the device 102, and is connected to the AI-based digital assistant (e.g., hosted on the server system 108). In accordance with implementations of the present disclosure, and as described in further detail herein, the user 120 can provide verbal input (e.g., speech) to the AI-based digital assistant, which can process the verbal input to request additional information (e.g., disambiguate), perform one or more actions, and/or provide one or more audible responses.

Figure 2:
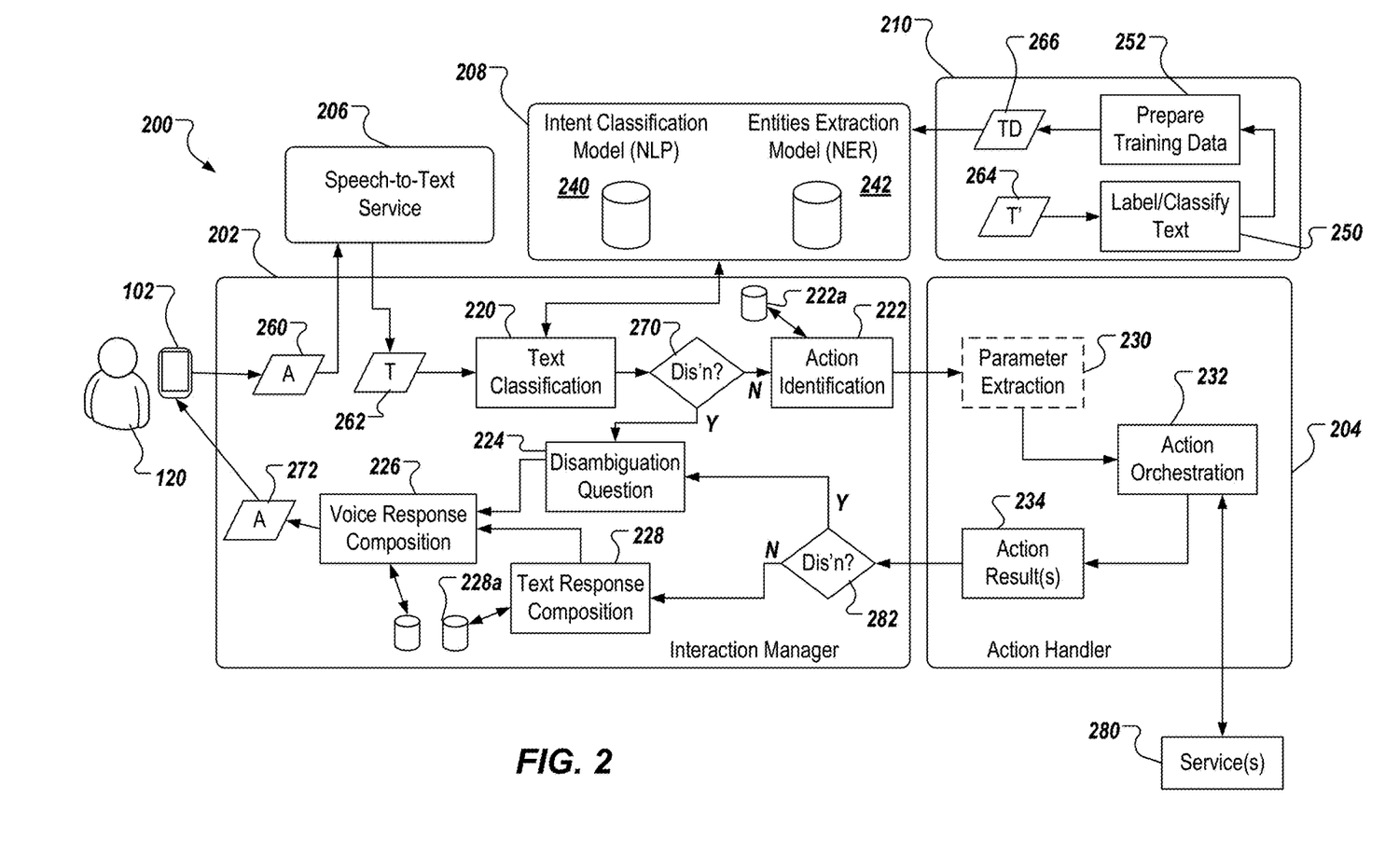
FIG. 2 depicts an example architecture in accordance with implementations of the present disclosure.

FIG. 2 depicts an example architecture 200 in accordance with implementations of the present disclosure. In some examples, components of the example architecture 200 can be hosted on one or more server systems (e.g., the server system 108 of FIG. 1). In the depicted example, the example architecture 200 includes an interaction manager 202, an action handler 204, a speech-to-text service 206, an artificial intelligence (machine intelligence) service 208, and a training data service 210. In some examples, each component of the example architecture 200 is provided as one or more computer-executable programs executed by one or more computing devices. In some examples, the interaction manager 202, and the action handler 204 are operated by, or on behalf of an enterprise (e.g., hosted on the server system 108 of FIG. 1, which is operated by, or on behalf of the enterprise).

In some examples, the speech-to-text service 206, the artificial intelligence service 208, and/or the training data service 210 are operated by, or on behalf of the enterprise (e.g., hosted on the server system 108 of FIG. 1, which is operated by, or on behalf of the enterprise), or are provided by one or more third-party service providers (e.g., hosted on a server system other than the server system 108, operated by, or on behalf of the one or more third-party service providers). An example speech-to-text service 206 includes Google Cloud Speech provided by Google, Inc. of Mountain View, Calif. In some examples, Google Cloud Speech converts audio data to text data by processing the audio data through neural network models. Although an example speech-to-text service 206 is referenced herein, implementations of the present disclosure can be realized using any appropriate speech-to-text service. An example artificial intelligence service 208 includes TensorFlow provided by Google, Inc. of Mountain View, Calif. In some examples, TensorFlow can be described as an open source software library for numerical computation using data flow graphs.

In the depicted example, the interaction manager 202 includes a text classification module 220, an action identification module 222, a disambiguation question module 224, a text response composition module 226, and a voice response composition module 228. The action handler 204 includes a parameter extraction module 230 (optional), an action orchestration module 232, and an action results module 234. The artificial intelligence service 208 includes an intent classification model (e.g., based on natural language processing (NLP)), and an entity extraction model 242 (e.g., based on named entity recognition (NER)). The training data service 210 includes a text labeling/classifying module 250, and a training data preparation module 252.

In accordance with implementations of the present disclosure, the artificial intelligence service 208 implements a convolutional neural network (CNN). In some examples, the CNN enables more efficient and faster processing of the text data than other types of AI networks. In general, a CNN can be described as a neural network having overlapping "reception fields" that perform convolution tasks. More particularly, a CNN is a type of feed-forward artificial neural network, which includes connectivity patterns between neurons, where receptive fields of different neurons partially overlap. In a CNN, a response of an individual neuron to data (stimuli) within its receptive field is mathematically approximated by a convolution operation.

In contrast, other neural networks, such as a recurrent neural network (RNN) implement recurrent connections, which form cycles in the RNN's topology. In some examples, a RNN can be described as being sequential, and not stateless. A RNN can suffer from the so-called vanishing (or exploding) gradient problem, where information is (rapidly) lost over time. Consequently, whatever the model learned in the past might be lost in the future, if it was overridden by intensive new information, for example.

In accordance with implementations of the present disclosure, the artificial intelligence service 208 implements word embedding in the NLP. In some examples, word embedding can be described as the collective name for a set of language modeling and feature learning techniques within the NLP, where words and/or phrases from a vocabulary are mapped to vectors of real numbers. Conceptually, word embedding involves a mathematical embedding from a space with one dimension per word to a continuous vector space with a much lower dimension. In general, word embedding enables the model to understand different words having the same meaning (synonyms), and understand such words without the need to actually teach the machine each word individually.

In accordance with implementations of the present disclosure, and as described in further detail herein, the interaction manager 202 receives communication data, and processes the communication data to provide a response, and/or to initiate execution of one or more actions.

The communication data can be provided through multiple channels. Example channels can include a voice channel (e.g., voice communication through a PSTN/NGN, voice communication using voice-over-Internet-protocol (VOIP), session initiation protocol (SIP)), a messaging channel (e.g., instant messaging), an email channel (e.g., desktop-based email, web-based email), and a text channel (e.g., SMS). Example implementations are described in further detail herein with reference to the communication data being provided as audio data provided during a voice interaction. In some examples, the audio data corresponds to speech of a user that is recorded (e.g., during a user telephone interaction, VOIP interaction). Accordingly, the response can include an audio response. In this manner, the AI-based digital assistant of the present disclosure can operate as a voice-based agent. In some implementations, the communication data is provided as text data. In some examples, the text data corresponds to a message transmitted by a user (e.g., a text message, a chat message). Accordingly, the response can include a text response. In this manner, the AI-based digital assistant of the present disclosure can operate as a chat bot, for example.

The example architecture 200 is described in further detail herein with reference to processing communication data including audio data, and providing an audio response. It is contemplated, however, that the communication data can include text data, as introduced above.

In the depicted example, the user 120 can audibly communicate with the interaction manager 202 using the device 102. For example, the user 120 can establish a communication path (e.g., telephone call) to communicate data from the device 102 to the interaction manager 202 (e.g., over the network 110 of FIG. 1). In some examples, the user 120 can speak to the device 102, which records the speech as audio data 260 that is transmitted to the interaction manager 202 (e.g., as streaming audio data; in one or more audio data files). The audio data 260 can be provided in any appropriate format (e.g., .wav, .mp3, .wma).

The interaction manager 202 provides the audio data 260 to the speech-to-text service 206 (e.g., through an application program interface (API) of the speech-to-text service 206). The speech-to-text service 206 processes the audio data 260 to provide text data 262. The text data 262 can be provided in any appropriate format (e.g., .txt, .csv). The text classification module 220 receives the text data 262, and processes the text data in coordination with the artificial intelligence service 208. In some examples, the text classification module 220 provides a request to the artificial intelligence service 208 (e.g., through an API of the artificial intelligence service 208), the request including at least a portion of the text data 262. In some examples, the text classification module 220 can inject one or more actions based on one or more classification rules. An example classification rule can include filtering curse words.

The artificial intelligence service 208 processes the received text data to provide an intent set, and an entity set. More particularly, the artificial intelligence service 208 processes the received text data through the intent classification model 240 using NLP to determine one or more intents of the text data, the one or more intents being included in the intent set. In some examples, an intent indicates a reason as to why the user is communicating with the AI-based digital assistant. For example, the text data can include "How many miles are in my frequent flier account," and example intents can be determined to be AccountQuery, and StatusQuery by the intent classification model 240. In some examples, an intent might not be determined from the text data. Consequently, the intent set can be empty. The artificial intelligence service 208 processes the received text data through the entity extraction model 240 using NER to determine one or more entities implicated within the text data, the one or more entities being included in the entity set. In some examples, an entity indicates a person, place, or thing (e.g., persons, organizations, locations, expressions of times, quantities, monetary values, percentages, etc.) implicated in the text data. For example, the text data can include "I would like to book travel from Austin to Frankfurt," and example entities can be determined to be LocationAustin, LocationFrankfurt, ThingTravel by the entity extraction model 240. In some examples, an entity might not be determined from the text data. Consequently, the entity set can be empty.

In some implementations, the text classification module 220 provides feedback for machine-learning. For example, the text classification module 220 can determine that some of the text data 262 was improperly, or poorly classified by the artificial intelligence service 208. For example, the artificial intelligence service 208 can provide intent classification, as well as a score indicative of how accurately the class was identified (e.g., a confidence index). In some examples, the scores (one score for each classification) can be compared to respective, customizable thresholds (e.g., per class). If the score of a class does not exceed the threshold, it can be determined that the class is poor/improper.

In some examples, the text classification 220 provides at least a portion of text data 264 to the training data service 210, which processes the text data 264 using the text labeling/classifying module 250, and the training data preparation module 252 to provide training data 266. The training data 266 is provided to the artificial intelligence service 208 to further train one or both of the intent classification model 240, and the entities extraction model 242. Although the training data service 210 is depicted as a separate service, the training data service 210 can be included as part of another service (e.g., the training data service 210 can be included in the artificial intelligence service 208).

It is determined whether disambiguation 270 is required. Although the disambiguation 270 is schematically depicted as an independent function, the text classification module 220, and/or the action identification module 222 can determine whether disambiguation is required. In some examples, disambiguation can be described as clarification of the text data 260, one or more entities identified in the text data 260, and/or one or more intents determined from the text data 260.

In some examples, disambiguation is required, if the intent set, and/or the entity set are empty. For example, if an intent cannot be determined from the text data 262, disambiguation can be required (e.g., request that the user repeat or clarify their question). In some examples, disambiguation is required, if an intent of the intent set does not correspond to a pre-defined list of intents. In some examples, a pre-defined list of intents can be provided for a particular domain, within which the AI-based digital agent is operating (e.g., flight reservations). In some examples, multiple pre-defined lists of intents can be provided, each pre-defined list of intents corresponding to a respective domain. In some examples, each intent provided in the intent set can be compared to intents of the pre-defined list of intents. If an intent of the intent set is not included in the pre-defined list of intents, disambiguation may be required. Continuing with the example above, an example intent in the intent set can include JewelryPurchase, which is not included in a pre-defined list of intents for the domain flight reservations. Consequently, disambiguation can be required in view of the intent JewelryPurchase being included in the set of intents.

In some examples, disambiguation can be required, if a number and or type of entities in the entity set do not correspond to an intent of the intent set. For example, to perform an action based on an intent, two or more entities can be required (e.g., a departure city, and an arrival city are required to determine flights). If, however, only a single entity is provided, or a single entity of the type required for the intent (e.g., only an arrival city is provided) in the entity set, disambiguation can be required (e.g., request the user to specify a departure city). In other words, for a given intent, one or more types of entities may be expected. If an expected entity (e.g., departure city) is absent from the entity set, disambiguation can be required. In some examples, disambiguation can be required, if an entity is too general. Continuing with the example above, an example entity set can include LocationAustin, LocationFrankfurt, and ThingTravel. It can be determined that travel is too general for one or more actions to be determined. Consequently, disambiguation may be required to clarify what is meant in the text data 260 (e.g., request that the user clarify whether plane, train, or automobile travel is being requested).

If disambiguation is required, at least a portion of one or more of the text data 260, the intent set, and the entity set is provided to the disambiguation question module 224. In some examples, the disambiguation question module 224 provides one or more disambiguation questions. In some examples, the disambiguation module 224 includes a pre-defined list of disambiguation questions based on the use-case (domain) that the AI-based digital agent is operating in (e.g., flight reservations). In some examples, a disambiguation question can be selected based on a look-up (e.g., using an index of disambiguation question) using one or more deficiencies of the intent set, and/or the entity set. For example, if the intent set is empty, the disambiguation question "I'm sorry, I did not understand your request, please repeat your question" can be selected. As another example, and in the example domain of flight reservations, if the entity set is empty, or only a single entity is included, example disambiguation questions can respectively include "What is the departure city, and the arrival city?" or "What is the departure city?" Continuing with the example above, in which it is determined that travel is too general for one or more actions to be identified, an example disambiguation question can include "Would you like automobile, boat, train, and/or airplane travel?"

In some examples, the disambiguation question is provided as text data, which is provided to the voice response composition module 226. The voice response composition module 226 processes the text data to provide audio data 272. For example, the voice response composition module 226 accesses a library of audio data based on one or more segments of the text data. In some examples, an index can be searched based on a segment (e.g., portion of the text data), an audio data can be retrieved. In some examples, audio data of respective segments can be appended together to provide the audio data 272. The audio data 272 is provided to the device 102 (e.g., over the network 110), and the device 102 plays the audio to the user 120.

If disambiguation is not required, at least a portion of one or more of the text data 260, the intent set, and the entity set are provided to the action identification module 222. The action identification module 222 provides a set of actions that are to be performed by the action handler 204. In some examples, the action identification module 222 references a library of available actions 222a. In some examples, the action identification module 222 accesses an index of the library of available actions 222a based on the intent(s) and the entit(y/ies).

In some examples, the set of actions includes one or more actions. Continuing with the example above, it can be determined that the user 120 is to book a flight from Austin, Tex. to Frankfurt, Germany, departing on Feb. 26, 2017, and returning on Mar. 2, 2017 (e.g., after one or more rounds of disambiguation). Consequently, an example action can include submission of a search query to a flight search engine, the search query including one or more search terms (e.g., depCity:AUS, arrCity:FRA, depDate: Feb. 26, 2017, retDate: Mar. 2, 2017). As another example, it can be determined that the user 120 is to purchase the fare using a credit card with given number, expiration data, and security code. Consequently, an example action can include submission of a payment authorization request to a payment service (e.g., the user's credit card company).

The set of actions can be provided to the parameter extraction model 230 of the action handler 204. The parameter extraction model 230 can process the set of actions to include one or more parameters. As introduced above, the response returned from the artificial intelligence service 208 to the text classification module 220 should be an intent set, and an entity set. After provision of the intent set, parameter extraction can be performed to select the proper/needed parameters to execute each action. Accordingly, the parameter extraction can eliminate any unnecessary parameters.

In some examples, the parameter extraction module 230 is optional. Consequently, the set of actions can be provided directly to the action orchestration module 232 from the action identification module 222. In some examples, this is optional in the case that the entity set is empty.

The action orchestration module 232 processes the set of actions to initiate performance of each action in the set of actions. In some examples, for each action, the action orchestration module 232 identifies one or more services 280 that are to be called for performance of the actions. In some examples, a service 280 is identified based on a type of action that is to be performed (e.g., flight search, credit card payment) from a pre-defined list of services (e.g., corresponding to the domain). One or more of the services 280 can be provided by a third-party service provider, and can be hosted on a back-end system. In some examples, the action orchestration module 232 transmits a request to one or more services 280 (e.g., through respective APIs of the services 280), each request including information to be processed by a respective service 280 to provide a result. Each service 280 processes a respective request, and transmits one or more results to the action orchestration module 232.

Continuing with the example above, the action orchestration module 232 can determine that a particular search service is to be called for performing a search using the example search query [depCity:AUS, arrCity:FRA, depDate: Feb. 26, 2017, retDate: Mar. 2, 2017]. The search service can process the request, and provide search results based thereon. Example search results can include one or more flights that are responsive to the search terms of the search query. The action orchestration module 232 provides a set of results to the action results module 234. In some examples, the action results module 234 parses the results of the action orchestration (e.g., whether a result includes a set of database results, or API (SOAP/HTTP) response) to a form that can be read by the interaction manager 202.

It can be determined whether disambiguation 282 is required. Although the disambiguation 282 is schematically depicted as an independent function, a module of the interaction handler 202 can determine whether disambiguation is required. If disambiguation is required, at least a portion of the set of results is provided to the disambiguation question module 224 to initiate provision of audio data 272 to the device 102, the audio data 272 providing one or more disambiguation questions, as described herein. In some examples, disambiguation can be required, if it is determined that the set of results includes one or more deficiencies. Continuing with the example above, it can be determined that the set of results includes, as an example deficiency, too many results to be efficiently communicated to the user 120. Consequently, an example disambiguation question can include "Would you like direct flights?" (e.g., a question having an answer that could be used to narrow results included in the set of results).

If disambiguation is not required, the set of results is provided to the text response composition module 228. The text response composition module 228 provides text data based on each result in the set of results. In some examples, the text composition module 228 references a library of text responses 228a. In some examples, the text composition module 228 accesses an index of the library of available text responses 228a based on a type of action, and the respective results. For example, if the action included credit card payment authorization, a result can include parameters [Visa, $489.07, ABC123DEF] indicating that a Visa payment of $489.07 has been approved and assigned the confirmation number ABC123DEF. Continuing with this example, text retrieved from the library of text responses 228a can include [credit card, payment, amount, approved, confirmation].

The text response composition module 228 provides the text data to the voice response composition module 226, which processes the text data to provide audio data 272, as described herein. Continuing with the above example, an example voice response can include "Your Visa payment of $489.07 has been approved, and your payment confirmation is ABC123DEF."

In accordance with implementations of the present disclosure, the voice response composition (e.g., provided by the voice response composition module 226) enables a more natural interaction between the AI-based digital assistant, and the user, and also enables a better representation of voice and better choice of correct words to deliver to the user. In this manner, the AI-based digital assistant of the present disclosure provides a seamless experience to the user, obviating potential user hesitation in interacting with the digital agent, because it is a machine. As described herein, the voice response composition composes voice responses" in real-time using multiple recorded voices. In this manner, the user experiences a seamless transition, in which differences between interacting with the AI-based digital assistant and a human being is minimized.

Figure 3:
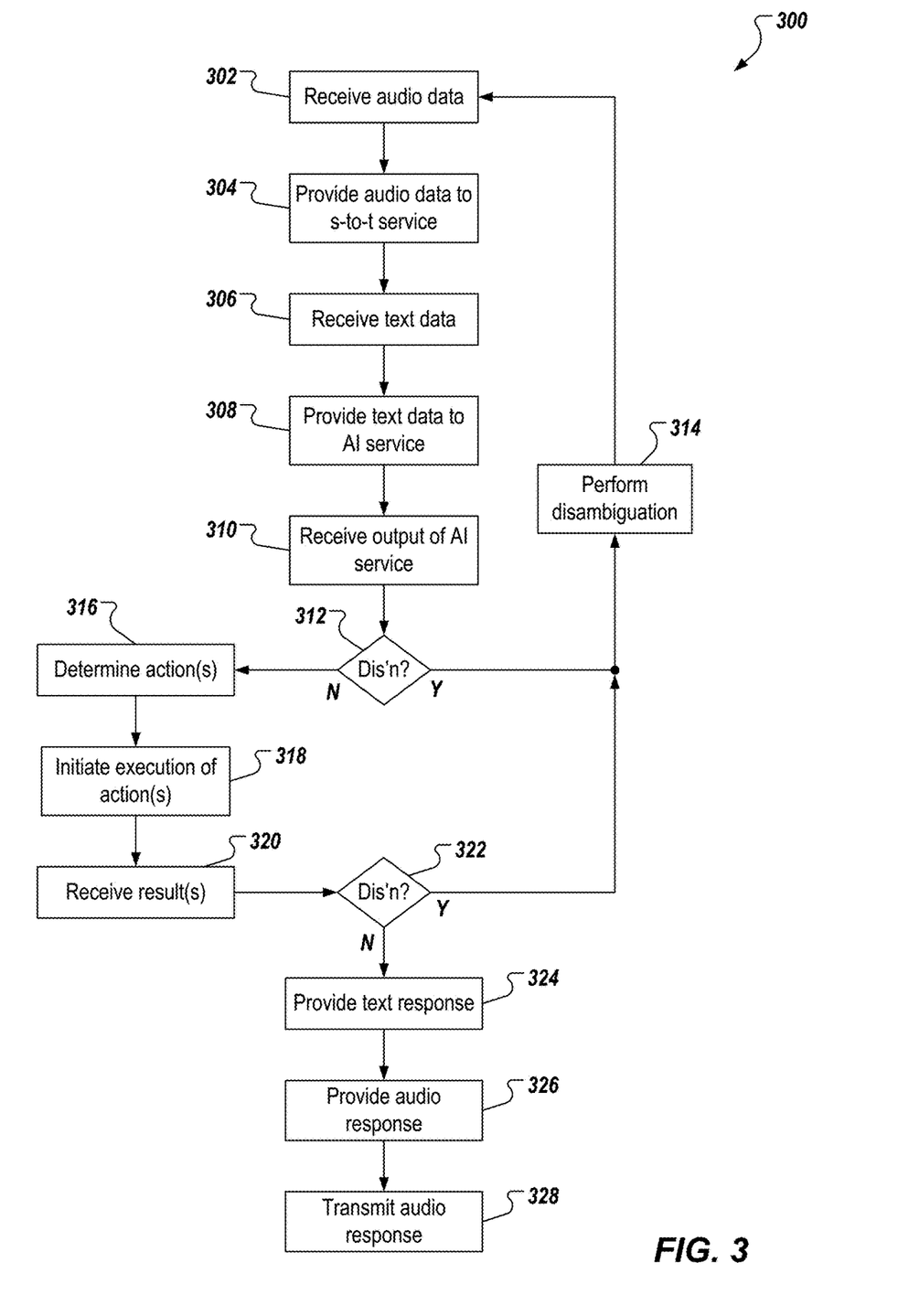
FIG. 3 depicts an example process that can be executed in accordance with implementations of the present disclosure.

FIG. 3 depicts an example process 300 that can be executed in implementations of the present disclosure. In some examples, the example process 300 is provided using one or more computer-executable programs executed by one or more computing devices (e.g., the server system 108 of FIG. 1). In some examples, the example process 300 can be executed to provide an AI-based digital assistant, as described herein.

Audio data is received (302). For example, the interaction manager 202 receives the audio data 260 from the device 102 over the network 110. Audio data is provided to a speech-to-text service (304). For example, the interaction manager 202 provides the audio data 260 to the speech-to-text service 206. Text data is received (306). For example, the interaction manager 202 receives the text data 262 from the speech-to-text service 206.

Text data is provided to an artificial intelligence service (308). For example, the interaction manager 202 (e.g., the text classification module 220) provides the text data 262 (or at least a portion of the text data 262) to the artificial intelligence system 208. Output of the artificial intelligence service is received (310). For example, the interaction manager 202 (e.g., the text classification module 220)

receives output of the artificial intelligence system 208. The output includes an intent set, and an entity set, as described herein.

It is determined whether disambiguation is required (312). For example, the interaction manager 202 determines whether disambiguation is required, as described herein. If disambiguation is required, disambiguation is performed (314). For example, and as described herein, the disambiguation question module 224 provides a disambiguation question as text data, which is provided to the voice response composition module 226. The voice response composition module 226 processes the text data to provide audio data 272. The audio data 272 is provided to the device 102 (e.g., over the network 110), and the device 102 plays the audio to the user 120.

If disambiguation is not required, one or more actions are determined (316). For example, and as described herein, the action identification module 222 provides a set of actions that are to be performed by the action handler 204 by referencing the library of available actions 222a. Execution of each of the one or more actions is initiated (318). For example, and as described herein, the action orchestration module 232 processes the set of actions to initiate performance of each action in the set of actions, by identifying one or more services 280 that are to be called for performance of the actions, and transmitting respective requests to the one or more services 280.

Results of execution of the one or more actions are received (320). For example, the action orchestration module 232 receives respective results from each of the one or more services 280. It is determined whether disambiguation is required (322). For example, if the set of results includes too many results to be efficiently communicated to the user 120, disambiguation can be required. If disambiguation is required, disambiguation is performed (314), as described herein. If disambiguation is not required, one or more text responses are provided (324). For example, the text response composition module 228 provides text data based on each result in the set of results (e.g., referencing the library of text responses 228a). An audio response is provided (326). For example, the text response composition module 228 provides the text data to the voice response composition module 226, which processes the text data to provide audio data 272. The audio response is transmitted (328). For example, the interaction handler 202 transmits the audio data 272 to the device 102 over the network 110.

As introduced above, implementations of the present disclosure provide an integration platform for enabling a service platform, such as the AI platform described herein, to interact with front-end channels, and back-end systems. As described in detail herein, the integration platform obviates the need to integrate with respective network infrastructures to enable communication with the AI platform.

Figure 4:
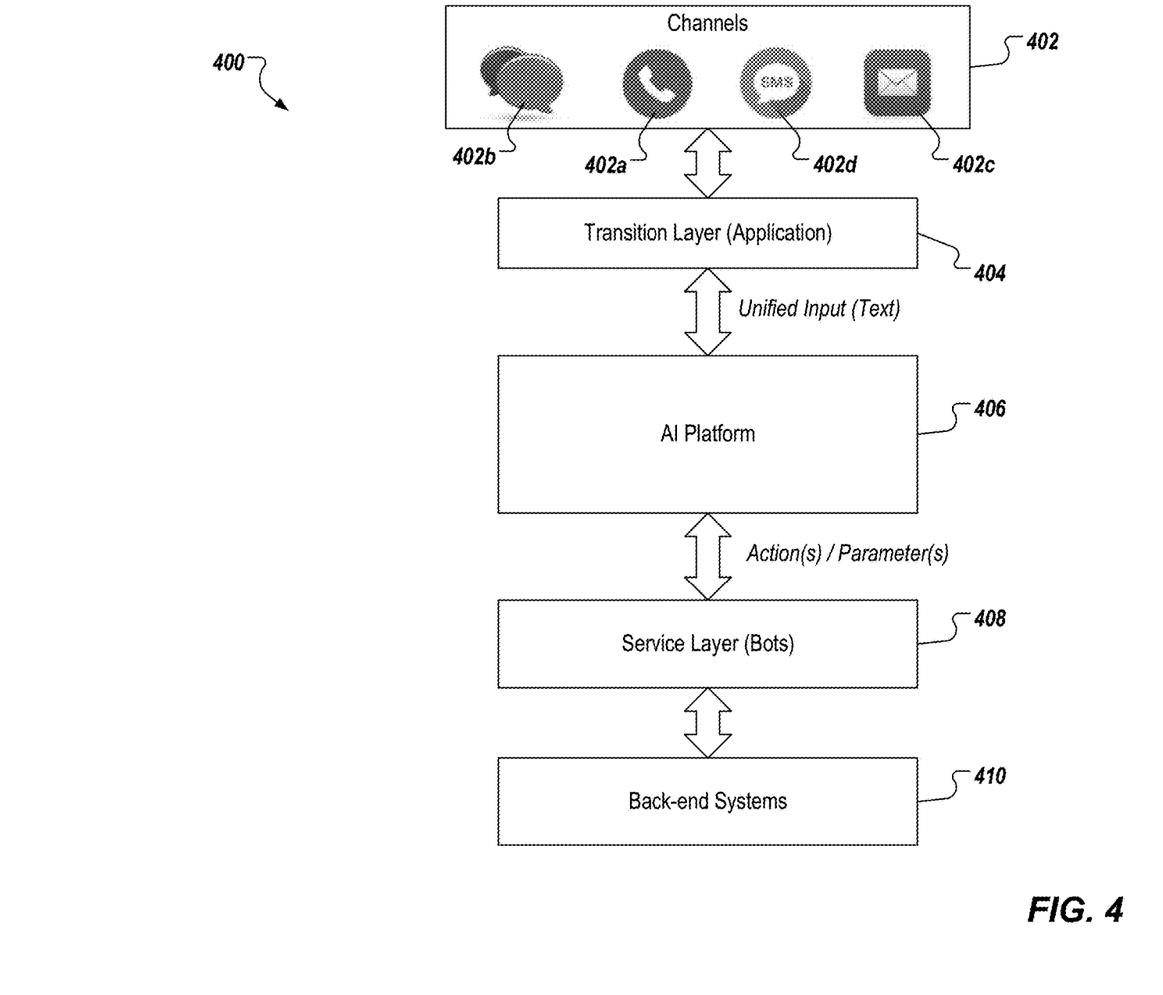
FIG. 4 depicts an example service platform integration in accordance with implementations of the present disclosure.

FIG. 4 depicts an example platform integration 400 in accordance with implementations of the present disclosure. The example platform integration includes channels 402, a transition layer 404, an AI platform 406, a service layer 408, and back-end systems 410. As described in further detail herein, the integration platform of the present disclosure provides the transition layer 404 to enable seamless, channel-agnostic communication with the AI platform 406 at the front-end, as well as the bot layer 408 to enable communication with the AI platform 406, and the back-end systems 410 at the back-end.

As introduced above, example channels 402 include a voice channel 402a (e.g., voice communication through a PSTN/NGN, voice communication using VOIP/SIP), a messaging channel 402b (e.g., instant messaging), an email channel 402c (e.g., desktop-based email, web-based email), and a text channel 402d (e.g., SMS). In some examples, the AI platform 406 includes at least a portion of the example architecture 200 of FIG. 2 (e.g., the interaction manager 202, the artificial intelligence service 208, the action handler 204). In some examples, the back-end systems 410 receive requests from, process services for, and provide responses to the AI platform 406.

In accordance with implementations of the present disclosure, the transition layer 404 includes an application that receives input from (and provides output to) the channels 402. In some implementations, the transition layer 404 (application) transmits the input in a unified format (e.g., text) to the AI platform, the unified format being the input format required by the AI platform to process the input. An example unified format includes Unicode Transformation Format-8 bit (UTF-8), which can be described as a character encoding capable of encoding all possible characters, or code points, defined by Unicode. Unicode can be described as a standard for consistent encoding, representation, and handling of text. In this manner, the text can be encoded regardless of language input by the user.

In some examples, the application is executed on a device (e.g., a desktop computer, a laptop computer, a tablet, a smartphone, a wearable device) that receives input from the channel. For example, in the case of a voice channel (e.g., telephone, VOIP/SIP), the application opens a streaming channel to a listening device (e.g., landline telephone, mobile phone), through which the application receives the voice input. The application provides the voice input to a speech-to-text service (e.g., the speech-to-text service 206 of FIG. 2), and receives the input as text data. In some implementations, the channel has a wired connection to the device executing the application. For example, a cable can be used to connect a landline telephone to the device executing the application. In some examples, the user can be providing input through non-voice channels, such as messaging, and email, as described herein. Regardless of the channel, through which the input originates, the application executing on the transition layer 404 provides unified input (e.g., UTF-8) to the AI platform 406. In this manner, multiple integrations of the AI platform into different, disparate network infrastructures is avoided, thereby obviating the burden (e.g., time, cost, technical resources) that would otherwise be required.

In accordance with implementations of the present disclosure, the service layer 408 includes a plurality of computer-executed software robots (bots) that conduct interactions with the back-end systems 410. In some examples, the AI platform 406 communicates with the service layer 408 through service calls (e.g., SOAP/REST call through web-service/API) to trigger respective back-end systems 410 to perform actions. In some examples, one call is provided for each action to be performed. In some implementations, the back-end systems 410 include back-end service applications that can be used to receive input to perform the actions. Example applications can include, without limitation, a legacy web applications using basic HTML, a more modern web application using HTML5, a Java-based application (e.g., JRE6, JRE8), and a MS Windows application (e.g., running on .NET Framework).

In some examples, each back-end service application provides a respective presentation layer (e.g., GUI) that enables input to be provided to the back-end service application. For example, the presentation layer can provide interface elements (e.g., buttons, dialogue boxes, drop-down menus, launch, maximize, minimize, submit) that can be used to provide input. In some examples, a bot is provided for a respective back-end service application, the bot interacting with the presentation layer to provide input for the back-end service application to perform an action. As noted above, the action corresponds to a user intent/inquiry as determined through a service platform (e.g., the AI platform 406 of FIG. 4). In some examples, a bot can interact with the presentation layer of a back-end service to perform one or more of the following example actions: read customer information from a customer relationship management (CRM) system, raise a ticket in a trouble ticketing system, collect establishments numbers from a directory service application, check the status of a service request, check billing information, and provide offers/packages.

In some implementations, each bot monitors the presentation layer of a respective back-end service to determine interface elements rendered on the presentation layer, and label each interface element with a respective label. For example, an interface element can include a text box (e.g., Text_Box_1), which is labeled as "Account Number" with action "Write." Accordingly, a bot will write the value of the account number inside the text box. As another example, an interface element can include a drop-down menu (e.g., Select_Drop_Down_List_1), which is labeled as "Service Type" with action "Navigate." Accordingly, the bot will navigate/select the value of the service from the drop down list. As another example, an interface element can include a selectable button (e.g., Button_1), which is labeled as "Submit" with action "Click." Accordingly, the bot will click on the button to submit a form. as another example, an interface element can include a text block (e.g., Text_Area_1), which is labeled as "Read_Config" with action "Read." Accordingly, the bot will go to this text area to read the results of the submitted information (e.g., the configurations of the specified service for the specific account number). In this manner, the bot learns what actions to take with respective elements, when providing input to (or receiving a response from) the back-end service.

In some implementations, responses from the back-services are provided to the AI platform 406 through the service layer 408, and the AI platform processes the result(s) (e.g., as described above with reference to FIG. 2) to provide output to the user through the transition layer 404, which output corresponds to the format provided form a respective channel. For example, if the original input was provided through the voice channel 402*a*, the output of the AI platform 406 can be provided as audible output (e.g., as described above with reference to FIG. 2). As another example, if the original input was provided through the text channel 402*d*, the output of the AI platform 406 can be provided as a text message.

Figure 5:
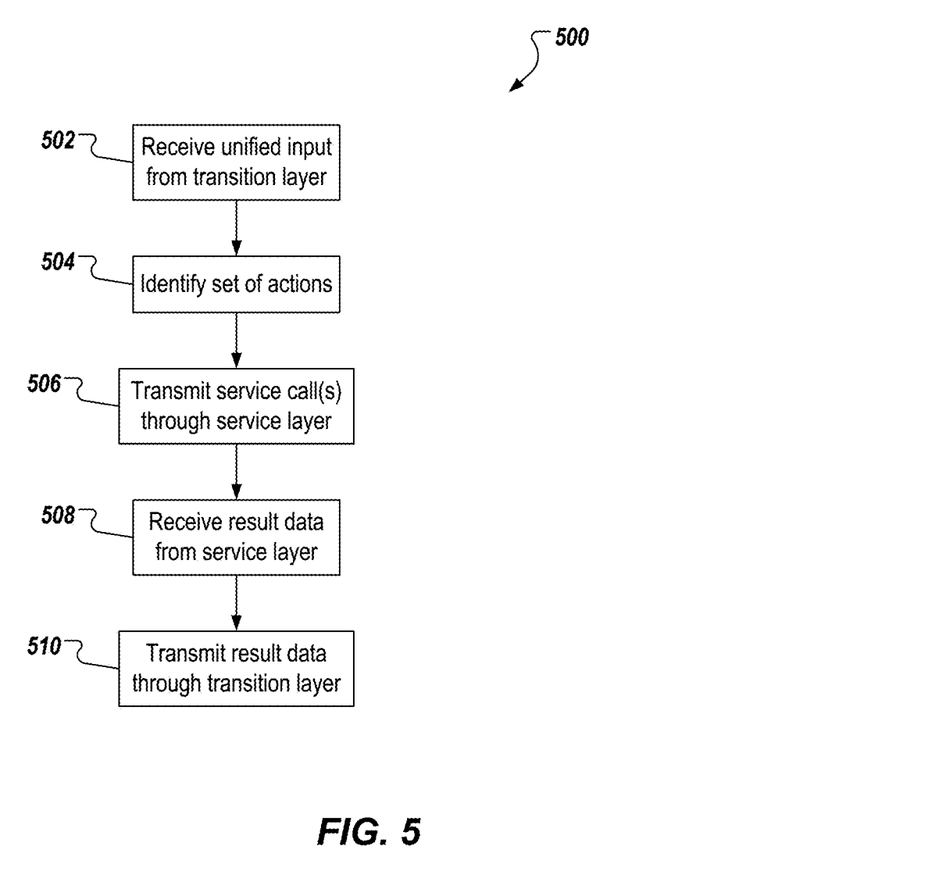
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Input is received from a transition layer (502). In some examples, the input is received by a service platform (e.g., the AI platform 406 of FIG. 4) through the transition layer (e.g., the transition layer 404 of FIG. 4). For example, and as described herein, the transition layer includes an application executed on a device of the user. The transition layer receives originating input provided from a user through a channel of multiple channels (e.g., the channels 402 of FIG. 4), and provides a unified input (e.g., UTF-8 encoded text) to the service platform. A set of actions is identified (504).

For example, the service platform includes an action identification module (e.g., the action identification module 222) that provides a set of actions that are to be performed by an action handler (e.g., the action handler 204) by referencing a database of available actions (e.g., the library of available actions 222*a*).

One or more service calls are transmitted through a service layer (506). For example, the service platform transmits service calls (e.g., SOAP/REST calls through web-service/API) through the service layer to trigger respective back-end systems to perform actions. More particularly, and as described herein, one or more bots of the service layer interact with respective presentation layers of one or more back-end systems to trigger execution of actions, and receive result data from the one or more back-end systems. Result data is received from the service layer (508). For example, the service layer provides result data receive from the one or more back-end services to the service platform. The result data is transmitted through the transition layer (510). For example, the service platform transmits the result data to the user through the transition layer. In some examples, and as described herein, the service platform processes the result data to provide output to the user through the transition layer, which output corresponds to the format provided from a respective channel.

In view of the foregoing, implementations of the present disclosure provide an integration platform that enables client devices to avoid direct integration with legacy systems, introduce new systems, and/or introduce new hardware. More particularly, the integration platform of the present disclosure is provided as a plug-and-play platform that combines both AI capabilities and robotics process automation to perform deep machine learning activities, and process on the application layer. Further, the integration platform of the present disclosure is multi-purpose across industries platform, meaning it can be implemented with, and adapted to any appropriate use case. As described herein, the integration platform of the present disclosure bridges multiple channels (e.g., instant messaging, email, SMS, voice). The integration platform of the present disclosure is technology agnostic from application perspective (e.g., whether the application is a legacy web applications using basic HTML, whether the application is a new web application using HTML5, whether the application is Java-based running on JRE6 or JRE8, whether the application is a MS Windows application running on .NET Framework 2.0 or 4.0). The integration platform is also technology agnostic from the perspective of the channels (e.g., whether the user is interacting with the platform using web-chat over social media (Facebook, Twitter, Instagram), web-chat applications, desktop-based email clients, web-based email client, PSTN, NGN, or any appropriate mobile network technology (2G, 3G, 4G, LTE)).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for integrating a computer-executed service platform with multiple channels, the method comprising:
providing a transition layer comprising a computer-executable application that is executed on a client-side device, the client-side device receiving originating input from a channel of the multiple channels available for communication through the client-side device, each channel corresponding to a respective network of a plurality of disparate networks, and the computer-executable application providing a unified input, the unified input being in a unified format that is independent of the channel, through which the originating input is received and that is required for processing by the service platform;
receiving, by the service platform, the unified input;
identifying, by the service platform, a set of actions based on the unified input, the set of actions comprising one or more actions to be executed by one or more computer-implemented, back-end services;
providing a service layer comprising a plurality of computer-executable bots, each bot interacting with a respective back-end service based on an action of the one or more actions to receive at least one result from the respective back-end service;
receiving, by one or more processors, result data comprising data describing the at least one result; and
transmitting, by the one or more processors, an output based on the result data through the transition layer of the client-side device.

2. The method of claim 1, wherein the client-device of the transition layer receives the input from a device of a user, the device having one of a wired and a wireless connection with the client-side device.

3. The method of claim 1, wherein the input is provided as verbal input of a user, and the transition layer processes the verbal input to provide the unified input, the unified input comprising text.

4. The method of claim 3, wherein processing the verbal input partially comprises transmitting the verbal input to a speech-to-text service, and receiving text data from the speech-to-text service.

5. The method of claim 1, wherein each bot interacts with a respective presentation layer of a back-end service to provide input to one or more user interface elements of the respective presentation layer.

6. The method of claim 5, wherein each bot initiates an action of the one or more actions to be performed by the respective back-end service based on at least one user interface interaction with the respective presentation layer.

7. The method of claim 1, wherein the output is provided through the transition layer in a format of the channel.

8. The method of claim 1, wherein the channel comprises one of a voice channel, a messaging channel, an email channel, and a text message channel.

9. The method of claim 1, wherein a noise filter is applied to the input received from the channel.

10. One or more non-transitory computer-readable storage media coupled to one or more processors and having instructions stored thereon which, when executed by the one or more processors, cause the one or more processors to perform operations for integrating a computer-executed service platform with multiple channels, the operations comprising:
providing a transition layer comprising a computer-executable application that is executed on a client-side device, the client-side device receiving originating input from a channel of the multiple channels available for communication through the client-side device, each channel corresponding to a respective network of a plurality of disparate networks, and the computer-executable application providing a unified input, the unified input being in a unified format that is independent of the channel, through which the originating input is received and that is required for processing by the service platform;
receiving, by the service platform, the unified input;
identifying, by the service platform, a set of actions based on the unified input, the set of actions comprising one or more actions to be executed by one or more computer-implemented, back-end services;
providing a service layer comprising a plurality of computer-executable bots, each bot interacting with a respective back-end service based on an action of the one or more actions to receive at least one result from the respective back-end service;
receiving result data comprising data describing the at least one result; and
transmitting an output based on the result data through the transition layer of the client-side device.

11. The computer-readable storage media of claim 10, wherein the client-device of the transition layer receives the input from a device of a user, the device having one of a wired and a wireless connection with the client-side device.

12. The computer-readable storage media of claim 10, wherein the input is provided as verbal input of a user, and the transition layer processes the verbal input to provide the unified input, the unified input comprising text.

13. The computer-readable storage media of claim 12, wherein processing the verbal input partially comprises transmitting the verbal input to a speech-to-text service, and receiving text data from the speech-to-text service.

14. The computer-readable storage media of claim 10, wherein each bot interacts with a respective presentation layer of a back-end service to provide input to one or more user interface elements of the respective presentation layer.

15. The computer-readable storage media of claim 14, wherein each bot initiates an action of the one or more actions to be performed by the respective back-end service based on at least one user interface interaction with the respective presentation layer.

16. The computer-readable storage media of claim 10, wherein the output is provided through the transition layer in a format of the channel.

17. The computer-readable storage media of claim 10, wherein the channel comprises one of a voice channel, a messaging channel, an email channel, and a text message channel.

18. The computer-readable storage media of claim 10, wherein a noise filter is applied to the input received from the channel.

19. A system, comprising:
one or more processors; and
a computer-readable storage device coupled to the one or more processors and having instructions stored thereon which, when executed by the one or more processors, cause the one or more processors to perform operations for integrating a computer-executed service platform with multiple channels, the operations comprising:
providing a transition layer comprising a computer-executable application that is executed on a client-side device, the client-side device receiving originating input from a channel of the multiple channels available for communication through the client-side device, each channel corresponding to a respective network of a plurality of disparate networks, and the computer-executable application providing a unified input, the unified input being in a unified format that is independent of the channel, through which the originating input is received and that is required for processing by the service platform;

receiving, by the service platform, the unified input;

identifying, by the service platform, a set of actions based on the unified input, the set of actions comprising one or more actions to be executed by one or more computer-implemented, back-end services;

providing a service layer comprising a plurality of computer-executable bots, each bot interacting with a respective back-end service based on an action of the one or more actions to receive at least one result from the respective back-end service;

receiving result data comprising data describing the at least one result; and transmitting an output based on the result data through the transition layer of the client-side device.

20. The system of claim 19, wherein the client-device of the transition layer receives the input from a device of a user, the device having one of a wired and a wireless connection with the client-side device.

21. The system of claim 19, wherein the input is provided as verbal input of a user, and the transition layer processes the verbal input to provide the unified input, the unified input comprising text.

22. The system of claim 21, wherein processing the verbal input partially comprises transmitting the verbal input to a speech-to-text service, and receiving text data from the speech-to-text service.

23. The system of claim 19, wherein each bot interacts with a respective presentation layer of a back-end service to provide input to one or more user interface elements of the respective presentation layer.

24. The system of claim 23, wherein each bot initiates an action of the one or more actions to be performed by the respective back-end service based on at least one user interface interaction with the respective presentation layer.

25. The system of claim 19, wherein the output is provided through the transition layer in a format of the channel.

26. The system of claim 19, wherein the channel comprises one of a voice channel, a messaging channel, an email channel, and a text message channel.

27. The system of claim 19, wherein a noise filter is applied to the input received from the channel.

* * * * *